(12) United States Patent
Lee et al.

(10) Patent No.: US 8,627,539 B2
(45) Date of Patent: Jan. 14, 2014

(54) CONNECTOR DEVICE FOR COUPLING WIPER ARM

(75) Inventors: Jong Wook Lee, Incheon (KR); Jeong Goo Lee, Seoul (KR)

(73) Assignees: Dongyang Mechatronics Corp. (KR); HST Co., Ltd. (KR)

( * ) Notice: Subject to any disclaimer, the term of this patent is extended or adjusted under 35 U.S.C. 154(b) by 0 days.

(21) Appl. No.: 13/614,614

(22) Filed: Sep. 13, 2012

(65) Prior Publication Data

US 2013/0152324 A1 Jun. 20, 2013

(30) Foreign Application Priority Data

Dec. 20, 2011 (KR) .................. 10-2011-0138496

(51) Int. Cl.
*B60S 1/40* (2006.01)

(52) U.S. Cl.
USPC ............. 15/250.32; 403/3; 403/321; 403/329

(58) Field of Classification Search
USPC ............. 15/250.32, 250.31, 250.351, 250.43, 15/250.44, 250.361; 403/3, 4, 24, 321, 403/326, 329
See application file for complete search history.

(56) References Cited

U.S. PATENT DOCUMENTS

| 4,179,767 A * | 12/1979 | Weiler et al. ............... 15/250.32 |
| 7,481,596 B2 * | 1/2009 | Thienard ........................ 403/329 |
| 2005/0028312 A1 * | 2/2005 | Coughlin ................... 15/250.32 |

FOREIGN PATENT DOCUMENTS

| EP | 1479576 | * 11/2004 |
| JP | 10016722 A | 1/1998 |
| KR | 200437875 Y1 | 12/2007 |
| KR | 200442554 Y1 | 11/2008 |
| KR | 20090030949 A | 3/2009 |
| KR | 20100023583 A | 3/2010 |
| KR | 20100049230 A | 5/2010 |

OTHER PUBLICATIONS

Notice of Allowance dated May 10, 2012 of Korean Patent Application No. 10-2011-0138496; 7 pages.
Korean Office Action dated Jan. 13, 2012 of Korean Patent Application No. 10-2011-0138496; 8 pages.

* cited by examiner

*Primary Examiner* — Gary Graham
(74) *Attorney, Agent, or Firm* — St. Onge Steward Johnston & Reens LLC

(57) ABSTRACT

A connector device for coupling a wiper arm and a wiper blade includes a coupling body, a first support portion provided on an upper surface of the coupling body and extending from the coupling body in a form of a cantilever and for applying an elastic restoration force to the wiper arm, a second support portion provided for supporting the wiper arm in a thicknesswise direction of the wiper arm to prevent the wiper arm from moving in the thicknesswise direction, and a third support portion for preventing the wiper arm from moving in a lengthwise direction of the wiper arm, wherein the second support portion is in a form of a hole with closed upper and lower sides and open front and rear sides.

2 Claims, 3 Drawing Sheets

CONNECTOR DEVICE FOR COUPLING WIPER ARM

CROSS-REFERENCE TO RELATED APPLICATIONS

This application claims the benefit of Korean Patent Application No. 10-2011-0138496, filed on Dec. 20, 2011, in the Korean Intellectual Property Office, the disclosure of which is incorporated herein in its entirety by reference.

FIELD OF THE INVENTION

The present invention relates to a wiper device for vehicles, and more particularly, to a connector device for coupling a wiper arm and a wiper blade.

BACKGROUND OF THE INVENTION

A wiper device for vehicles is a safety device used to remove water and dirt due to rain, snow, etc. from a windshield using a wiper blade, when a driver's field of vision is obstructed. The wiper device is installed at not only the windshield but also on a rear window, an outside side-view mirror, a head lamp, etc.

Korean Patent Publication No. 2010-0023583 discloses an example of a wiper device. According to the publication, a wiper device includes a motor, a frame, a linkage, a wiper arm, and a wiper blade.

In general, a wiper arm and a wiper blade are detachably coupled to each other. This is to facilitate replacement of the wiper blade, which is a consumable article. Also, the wiper blade coupled to the wiper arm is capable of rotating in a predetermined angle range. A structure for coupling a wiper arm and a wiper blade is generally referred to as a connector device. A connector device is rotatably coupled to a wiper blade. A wiper arm is fixed to the connector device so that the wiper blade may remove foreign materials from a windshield.

A "U" hook type wiper arm is generally used as a wiper arm coupled to a connector device. Korean Patent Publication No. 2010-0049230 discloses an example of a coupling structure between a "U" hook type wiper arm and a wiper blade. However, it is a problem that a conventional connector device can only couple one type of wiper arm. In general, there are various kinds of wiper arms having different wiper arm thicknesses or radii of curvature of a "U" hook portion for different types of vehicle. Thus, various conventional connector devices need to be separately manufactured to fit to respective wiper arms. As a result, specifications management may be complicated, manufacturing costs may be increased, and workers on vehicle assembly lines may be confused by assembly specifications.

SUMMARY OF THE INVENTION

The present invention provides a connector device for coupling a wiper arm having an improved structure to couple various types of wiper arms.

According to an aspect of the present invention, a connector device for coupling a wiper arm of a "U" hook type and a wiper blade includes a coupling body surrounded by the wiper arm, a first support portion provided on an upper surface of the coupling body and extending from the coupling body in a form of a cantilever and for applying an elastic restoration force to the wiper arm to separate the wiper arm from the upper surface of the coupling body, a second support portion provided at a lower side of the coupling body and for supporting the wiper arm in a thicknesswise direction of the wiper arm to prevent the wiper arm from moving in the thicknesswise direction by accommodating an end portion of the wiper arm, and a third support portion formed at an end portion of the second support portion and for preventing the wiper arm from moving in a lengthwise direction of the wiper arm, the third support portion being of a step type, in which the second support portion is in a form of a hole with closed upper and lower sides and open front and rear sides, and a slot type hole is formed in a side surface of the second support portion to allow seeing of whether the wiper arm is appropriately assembled.

The connector device may further include a fourth support portion protruding downward from a lower surface of the coupling body and arranged in front of the third support portion.

The connector device may further include a cover member rotatably coupled to a side wall portion extending forward from two side surfaces of the coupling body and for preventing the wiper arm coupled to the coupling body from escaping from a front side of the coupling body.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
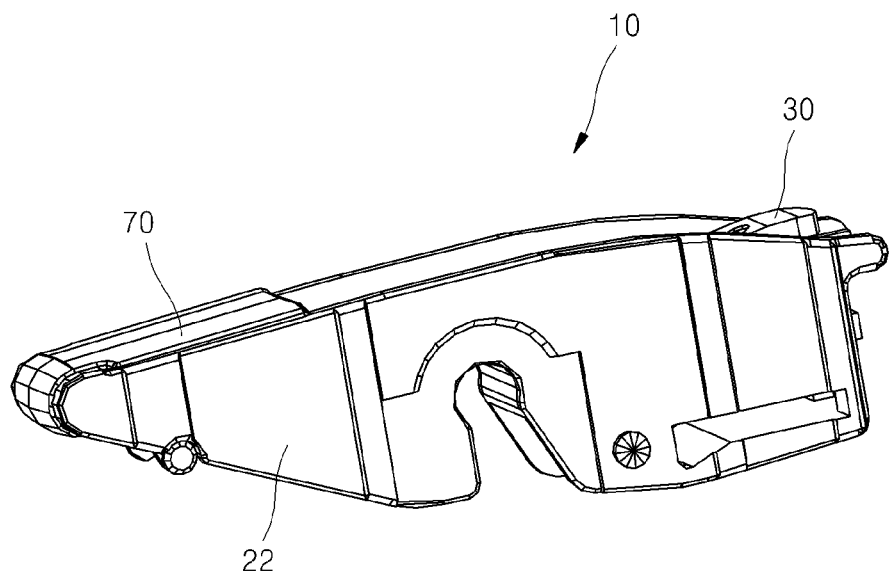
FIG. 1 is a perspective view of a connector device for coupling a wiper arm according to an embodiment of the present invention.

The attached drawings for illustrating exemplary embodiments of the present invention are referred to in order to gain a sufficient understanding of the present invention, the merits thereof, and the objectives accomplished by the implementation of the present invention. Hereinafter, the present invention will be described in detail by explaining exemplary embodiments of the invention with reference to the attached drawings. Like reference numerals in the drawings denote like elements.

Referring to FIGS. 1 to 7, a connector device 10 for coupling a wiper arm (hereinafter, referred to as the connector device 10) according to an embodiment of the present invention is used to couple a wiper blade (not shown) and a wiper arm 100 or 101 of a "U" hook type.

The connector device 10 includes a coupling body 20, side wall portions 22, a first support portion 30, a second support portion 40, a third support portion 50, a fourth support portion 60, and a cover member 70.

The coupling body 20 is a portion where the wiper arm 100 or 101 is coupled. The coupling body 20 includes an outer circumferential surface having a radius of curvature that is the same as that of the wiper arm 101 or smaller than that of the wiper arm 100. In other words, the coupling body 20 is surrounded by the wiper arm 100 or 101. The coupling body 20 has a connection groove for coupling to the wiper blade. The coupling body 20 largely has a shape corresponding to an end portion of the wiper arm 100 or 101 of a "U" hook type.

The side wall portions 22 are portions formed by extending forward from two opposite side surfaces of the coupling body 20. A distance between the side wall portions 22 at the opposite side surfaces of the coupling body 20 may match a width of the wiper arm 100 or 101. Accordingly, the wiper arm 100 or 101 may be prevented by the side wall portions 22 from moving in a widthwise direction of the wiper arm 100 or 101.

Figure 2:
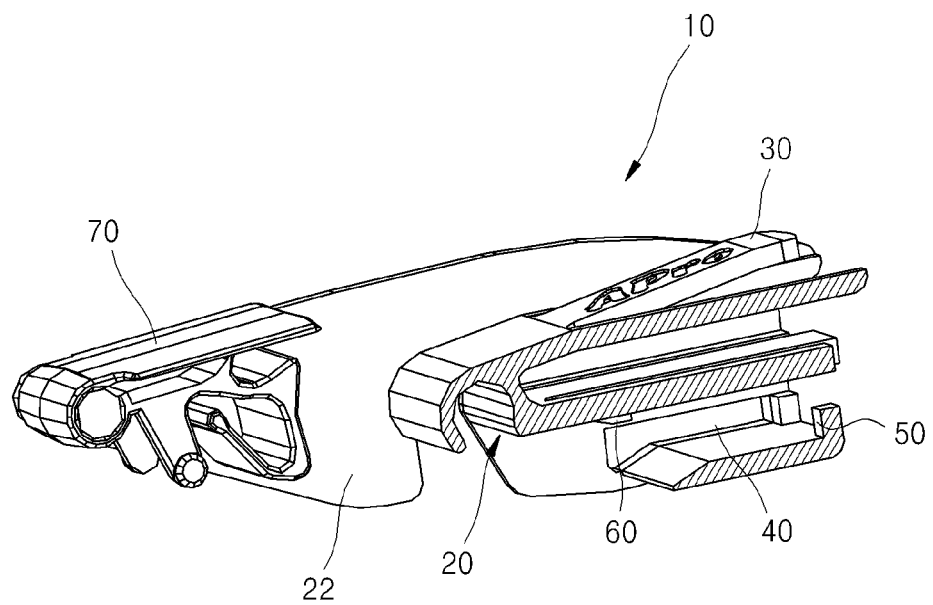
FIG. 2 is a partially cut-away perspective view of the connector device of FIG. 1.
Figure 3:
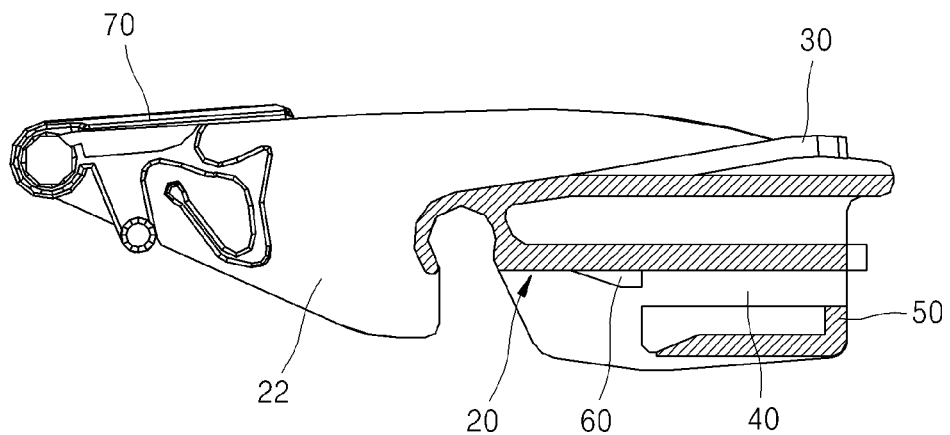
FIG. 3 is a cross-sectional view of the connector device of FIG. 2, viewed from a different direction.
Figure 4:
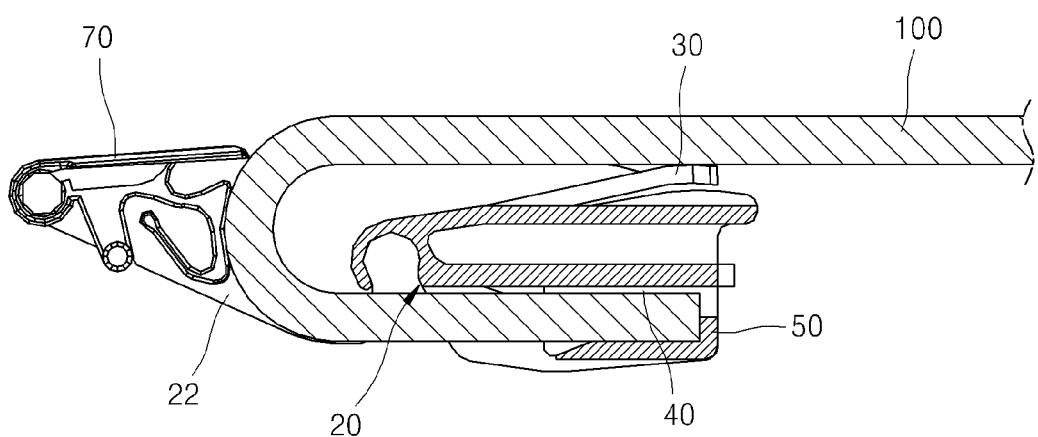
FIG. 4 is a cross-sectional view illustrating a state in which a wiper arm is coupled to the connector device of FIG. 3.

The first support portion 30 is provided in an upper portion of the coupling body 20. The first support portion 30 extends from the coupling body 20 in the form of a cantilever. In detail, the first support portion 30 extends upward and obliquely toward a rearward of the coupling body 20 as illustrated in FIG. 2. A free end portion of the first support portion 30 elastically supports a lower surface of the wiper arm 100 as illustrated in FIG. 4. In other words, the first support portion 30 applies an elastic restoration force to the wiper arm 100 or 101 such that the wiper arm 100 or 101 may be separated from the upper surface of the coupling body 20.

The second support portion 40 is provided in a lower side of the coupling body 20. The second support portion 40 is formed to accommodate the end portion of the wiper arm 100. The second support portion 40 prevents the wiper arm 100 from moving in a thicknesswise direction of the wiper arm 100. The second support portion 40 is in the form of a hole with closed upper and lower sides and open front and rear sides. A hole in the form of a slot may be formed in a side surface of the second support portion 40 to allow seeing of whether the wiper arm 100 is appropriately assembled. In the preset embodiment, the second support portion 40 is a hole having a roughly rectangular section.

The third support portion 50 is formed at an end portion of the second support portion 40. In detail, the third support portion 50 is formed at a rear end portion of the second support portion 40. The third support portion 50 is a structure of a step type. The third support portion 50 prevents the wiper arm 100 from moving in a lengthwise direction of the wiper arm 100. The end portion of the wiper arm 100 of a "U" hook type may contact the third support portion 50 and be supported thereby.

Figure 5:
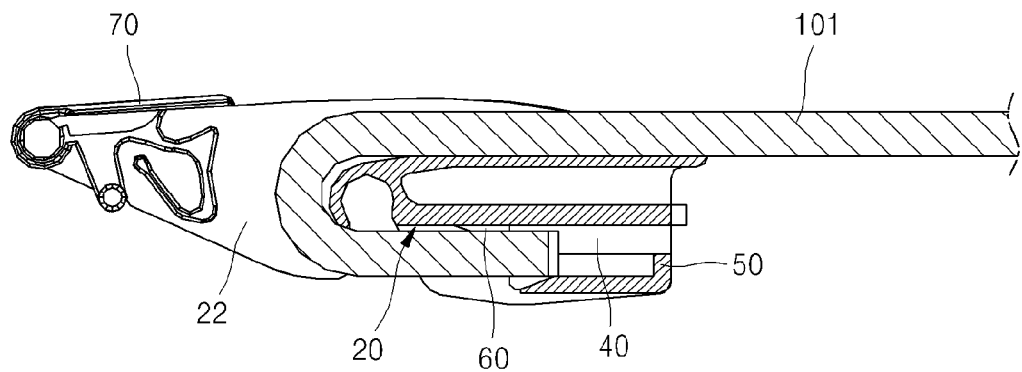
FIG. 5 is a cross-sectional view illustrating a state in which a different type of wiper arm is coupled to the connector device of FIG. 3.
Figure 6:
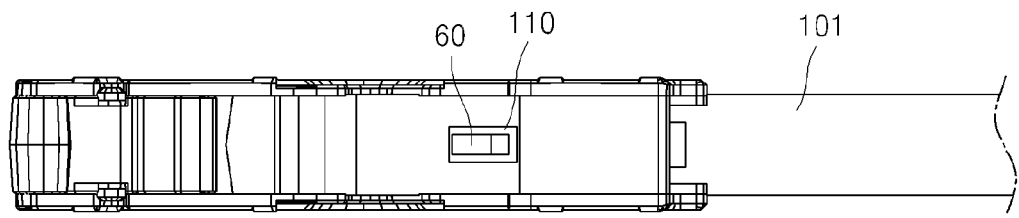
FIG. 6 is a bottom side view of the connector device of FIG. 5.

The fourth support portion 60 is a structure for performing an auxiliary role of the third support portion 50. The fourth support portion 60 protrudes downward from the lower surface of the coupling body 20. The fourth support portion 60 is arranged in front of the third support portion 50. The fourth support portion 60 prevents the wiper arm 101 having a shape as illustrated in FIG. 5 from moving in a lengthwise direction of the wiper arm 101. To this end, the fourth support portion 60 is accommodated in a coupling hole 110 provided in the wiper arm 101 as illustrated in FIG. 6.

The cover member 70 is rotatably coupled to the side wall portions 22 extending forward from both side surfaces of the coupling body 20. The cover member 70 prevents the wiper arm 100 or 101 coupled to the coupling body 20 from escaping to a front side of the coupling body 20. The cover member 70 may fill an empty space of the connector device 10 and thus make an outer appearance of the connector device 10 aesthetically pleasing.

An operation and effect of the present invention will now be described in detail with an example of a process of coupling the connector device 10 configured as above and the wiper arm 100 or 101.

In general, the wiper arm 100 or 101 of a "U" hook type includes a type A as illustrated in FIG. 4 and a type B as illustrated in FIG. 5. The wiper arm 100 of the type A includes three kinds of thicknesses of 3 mm, 3.5 mm, and 4 mm, whereas the wiper arm 101 of the type B includes four kinds of thicknesses of 2.5 mm, 3 mm, 3.5 mm, and 4 mm.

Referring to FIG. 4, in a process of coupling the wiper arm 100 of the type A to the connector device 10, the wiper arm 100 approaches the coupling body 20 such that a hook portion of the wiper arm 100 may surround the coupling body 20. In the process, the cover member 70 is rotated and placed in an open state. The wiper arm 100 has a radius of curvature larger than that of the coupling body 20. Accordingly, as illustrated in FIG. 4, the wiper arm 100 does not contact the upper surface of the coupling body 20. In the process, the first support portion 30 elastically supports the lower surface of the wiper arm 100. In other words, the first support portion 30 applies an elastic restoration force in a direction in which the wiper arm 100 is separated from the coupling body 20. Also, the second support portion 40 accommodates the end portion of the wiper arm 100 to prevent the wiper arm 100 from moving in the thicknesswise direction of the wiper arm 100. In other words, the second support portion 40 prevents the wiper arm 100 from moving in up and down directions. Also, movement of the wiper arm 100 in the widthwise direction is prevented by the side wall portions 22.

The third support portion 50 contacts and supports the end portion of the wiper arm 100 to prevent the wiper arm 100 from moving to a rear side of the connector device 10. In other words, the first support portion 30 prevents the wiper arm 100 from moving in the up and down directions. The second support portion 40 prevents the wiper arm 100 from moving in the up and down directions. Additionally, the second support portion 40 prevents the wiper arm 100 from moving in the left and right directions due to its rectangular cross section. The third support portion 50 prevents the wiper arm 100 from moving to the rear side of the connector device 10. The fourth support portion 60 accommodated in the coupling hole 110 formed in the wiper arm 100 auxiliarly prevents the wiper arm 100 from moving to the front or rear side of the connector device 10. The cover member 70 supports a front side of the wiper arm 100 to auxiliarly prevent the wiper arm 100 from moving to the front side of the connector device 10. In other words, either of the fourth support portion 60 and the cover member 70 may substitutionally perform a movement prevention operation when the other is damaged.

Figure 7:
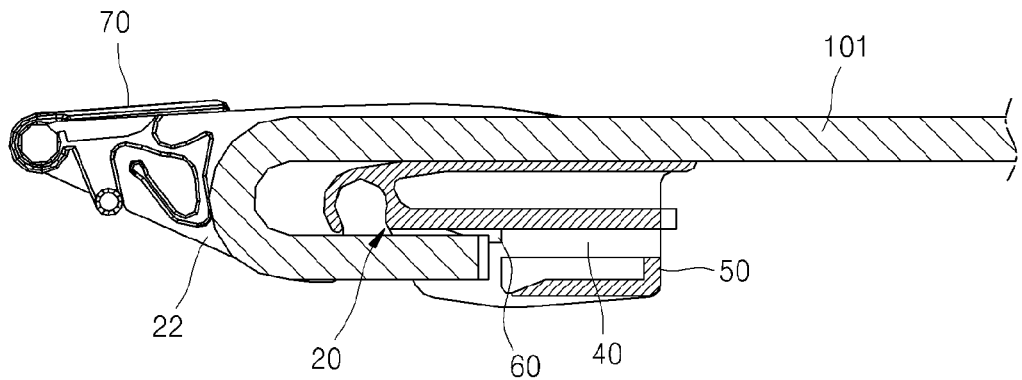
FIG. 7 is a cross-sectional view schematically illustrating movement of a wiper arm when a fourth support portion is broken in the connector device of FIG. 5.

A process of coupling the wiper arm 101 of the B type to the connector device 10 will now be described below with reference to FIGS. 5 through 7.

The wiper arm 101 approaches the coupling body 20 such that a hook portion of the wiper arm 101 may surround the coupling body 20. In the process, the cover member 70 is rotated and placed in an open state. The wiper arm 101 has the same radius of curvature as that of the coupling body 20. Accordingly, as illustrated in FIG. 5, the upper surface of the coupling body 20 and the wiper arm 101 contact each other. In the process, the first support portion 30 is elastically deformed by a lower surface of the wiper arm 101 and thus the first support portion 30 may be parallel to the upper surface of the coupling body 20. Also, the second support portion 40 accommodates the end portion of the wiper arm 101 to prevent the wiper arm 101 from moving in a thicknesswise direction of the wiper arm 101. The fourth support portion 60 accommodated in the coupling hole 110 formed in the wiper arm 101 prevents the wiper arm 101 from moving to the front or rear side of the connector device 10. In other words, the first support portion 30 prevents the wiper arm 101 from moving in the up and down directions. The second support portion 40 prevents the wiper arm 101 from moving in the up and down directions. The fourth support portion 60 prevents the wiper arm 101 from moving to the front or rear side of the wiper arm 101. In the meantime, when the fourth support portion 60 is unexpectedly damaged as illustrated in FIG. 7, the cover member 70 supports a front side of the wiper arm 101 to prevent the wiper arm 101 from escaping from the front side of the connector device 10. In other words, either of the fourth support portion 60 and the cover member 70 may substitutionally perform a movement prevention operation when the other is damaged. Movement of the wiper arm 101 to the rear side of the connector device 10 may be prevented as a curved portion of the coupling body 20 contacts a curved portion of the wiper arm 101 as illustrated in FIG. 5.

As such, two types of "U" hook type wiper arms having different radii of curvature may be effectively coupled. Also, even when the thickness of each type of wiper arm varies, an elastic restoration force of the first support portion 39 may make the variation be within an allowable range.

As described above, in the connector device for coupling a wiper arm according to the present invention, since various types of wiper arms having different thicknesses and radii of curvature are coupled to one connector device, manufacturing costs of a connector device may be reduced and types of connector devices to be managed may be reduced, thereby improving assembly and productivity.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A connector device for coupling a wiper arm of a "U" hook shape and a wiper blade, the connector device comprising:
   a coupling body surrounded by the wiper arm;
   a first support portion provided on an upper surface of the coupling body and extending from the coupling body in a form of a cantilever and for applying an elastic restoration force to the wiper arm to separate the wiper arm from the upper surface of the coupling body;
   a second support portion provided at a lower side of the coupling body and for supporting the wiper arm in a thicknesswise direction of the wiper arm to prevent the wiper arm from moving in the thicknesswise direction by accommodating an end portion of the wiper arm;
   a third support portion formed at an end portion of the second support portion and for preventing the wiper arm from moving in a lengthwise direction of the wiper arm, the third support portion being of a step shape; and,
   a fourth support portion protruding downward from a lower surface of the coupling body and arranged in front of the third support portion;
   wherein the second support portion is in a form of a hole with closed upper and lower sides and open front and rear sides, and a slot shaped hole is formed in a side surface of the second support portion to allow seeing of whether the wiper arm is appropriately assembled.

2. The connector device of claim 1, further comprising a cover member rotatably coupled to a side wall portion extending forward from two side surfaces of the coupling body and for preventing the wiper arm coupled to the coupling body from escaping from a front side of the coupling body.

* * * * *